(12) United States Patent
Park et al.

(10) Patent No.: US 10,320,236 B2
(45) Date of Patent: Jun. 11, 2019

(54) WIRELESS POWER TRANSMISSION APPARATUS AND METHOD OF CONTROLLING THE SAME

(71) Applicant: SAMSUNG ELECTRO-MECHANICS CO., LTD., Suwon-si (KR)

(72) Inventors: Seung Won Park, Suwon-si (KR); Sang Ho Cho, Suwon-si (KR); Eun Young Shin, Suwon-si (KR); Jae Suk Sung, Suwon-si (KR); Chang Ik Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 257 days.

(21) Appl. No.: 15/200,266

(22) Filed: Jul. 1, 2016

(65) Prior Publication Data

US 2017/0126065 A1    May 4, 2017

(30) Foreign Application Priority Data

Oct. 28, 2015  (KR) .................. 10-2015-0150053

(51) Int. Cl.
| | |
|---|---|
| *H02J 50/12* | (2016.01) |
| *H02J 7/04* | (2006.01) |
| *H02M 3/337* | (2006.01) |
| *H02J 7/02* | (2016.01) |
| *H02J 7/00* | (2006.01) |

(52) U.S. Cl.
CPC .............. *H02J 50/12* (2016.02); *H02J 7/045* (2013.01); *H02M 3/337* (2013.01); *H02J 7/0042* (2013.01); *H02J 7/0052* (2013.01); *H02J 7/025* (2013.01); *H02J 2007/0059* (2013.01); *Y02B 70/1433* (2013.01)

(58) Field of Classification Search
CPC .......... H02J 50/12; H02J 7/045; H02J 7/0042; H02J 7/0052; H02J 7/025; H02J 2007/0059; H02J 17/00; H02M 3/337; Y02B 70/1433; H01F 38/14; H04B 5/0037
USPC ....................................... 307/104
See application file for complete search history.

(56) References Cited

U.S. PATENT DOCUMENTS

| | | | |
|---|---|---|---|
| 2010/0219696 A1 | 9/2010 | Kojima | |
| 2015/0097438 A1* | 4/2015 | Aioanei | H02J 7/025 307/104 |

FOREIGN PATENT DOCUMENTS

| | | |
|---|---|---|
| CN | 104471821 A | 3/2015 |
| JP | 4815499 B2 | 9/2011 |
| JP | 2013-536664 A | 9/2013 |
| KR | 10-2013-0005571 A | 7/2013 |

(Continued)

OTHER PUBLICATIONS

Korean Office Action dated Nov. 30, 2016 in corresponding Korean patent application No. 10-2015-0150053 (13 pages with English translation).

(Continued)

*Primary Examiner* — Carlos Amaya
(74) *Attorney, Agent, or Firm* — NSIP Law

(57) ABSTRACT

A wireless power transmission apparatus includes a resonator configured to be magnetically coupleable to a wireless power reception apparatus; an inverter configured to operate the resonator; and a resonant frequency controller configured to control a resonant frequency of the resonator in response to a change in operating frequency of the inverter.

15 Claims, 7 Drawing Sheets

(56) References Cited

FOREIGN PATENT DOCUMENTS

| KR | 10-2013-0087708 A | 8/2013 |
|----|-------------------|--------|
| WO | WO 2011/156555 A2 | 12/2011 |
| WO | WO 2014/014630 A1 | 1/2014 |

OTHER PUBLICATIONS

Chinese Office Action dated February 3, 2019 in corresponding Chinese Patent Application No. 2016106087474 (12 pages in English, 7 pages in Chinese).

* cited by examiner

WIRELESS POWER TRANSMISSION APPARATUS AND METHOD OF CONTROLLING THE SAME

CROSS-REFERENCE TO RELATED APPLICATIONS

This application claims the benefit of Korean Patent Application No. 10-2015-0150053, filed on Oct. 28, 2015 in the Korean Intellectual Property Office, the entire disclosure of which is incorporated herein by reference for all purposes.

BACKGROUND

1. Field

The following description relates to a wireless power transmission apparatus and a method of controlling the same.

2. Description of Related Art

In accordance with the development of wireless technology, non-contact type wireless charging techniques capable of charging electronic apparatuses even in a non-contact state are being developed.

In wireless charging techniques according to the related art, settings for wireless charging are fixed. For example, to implement efficient wireless charging, an object for wireless charging needs to be set, or a position or the like, of a wireless power reception apparatus should be fixed.

Therefore, in the related art technologies, when the object for wireless charging is changed, or variations in wireless charging environments such as changes in position occur, wireless charging is not available, or wireless charging efficiency may be significantly lowered.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a wireless power transmission apparatus includes a resonator configured to be magnetically coupleable to a wireless power reception apparatus; an inverter configured to operate the resonator; and a resonant frequency controller configured to control a resonant frequency of the resonator in response to a change in operating frequency of the inverter.

The resonant frequency controller may be further configured to decrease the resonant frequency in response to the operating frequency increasing to a predetermined level or more.

The resonant frequency controller may be further configured to increase the resonant frequency in response to the operating frequency decreasing to a predetermined level or less.

The resonant frequency controller may be further configured to vary capacitance of the resonator, thereby varying the resonant frequency.

The wireless power transmission apparatus may further include a controller configured to identify a required power of the wireless power reception apparatus and adaptively adjust the operating frequency of the inverter in response to the required power.

The controller may be further configured to decrease the operating frequency in response to the required power increasing.

The resonant frequency controller may include a variable capacitor configured to vary capacitance of the resonator; and a capacitance controller configured to detect the operating frequency of the inverter and compare the operating frequency with a predetermined range to change capacitance of the variable capacitor responsive to the comparison.

The capacitance controller may be further configured to increase the capacitance of the variable capacitor in response to the operating frequency reaching a predetermined upper limit.

The capacitance controller may be further configured to decrease the capacitance of the variable capacitor in response to the operating frequency reaching a predetermined lower limit.

According to another general aspect, a method of controlling a wireless power transmission apparatus includes identifying a required power of a wireless power reception apparatus; changing an operating frequency of an inverter connected to a resonator in response to a change in the required power, the resonator being magnetically coupled to the wireless power reception apparatus; and changing a resonant frequency of the resonator when the operating frequency is outside of a predetermined range.

The changing of the operating frequency of the inverter may include decreasing the operating frequency in response to the required power increasing; and increasing the operating frequency in response to the required power decreasing.

The changing of the resonant frequency of the resonator may include decreasing the resonant frequency in response to the operating frequency increasing to a predetermined level or more.

The changing of the resonant frequency of the resonator may include increasing the resonant frequency in response to the operating frequency decreasing to a predetermined level or less.

The changing of the resonant frequency of the resonator may include increasing capacitance of the resonator in response to the operating frequency increasing to a predetermined level or more.

The changing of the resonant frequency of the resonator may include decreasing capacitance of the resonator in response to the operating frequency decreasing to a predetermined level or less.

According to another general aspect, a wireless power transmission apparatus, includes a wireless power resonator; a power supply operably coupled to the wireless power resonator and configured to supply power thereto; and a resonant frequency controller configured to control a resonant frequency of the wireless power resonator in response to a detected operational characteristic of the power supply.

The resonant frequency controller may be further configured to detect a load on the power supply and adaptively adjust the resonant frequency of the wireless power resonator in response to the detection.

The power supply may include an inverter, and the resonant frequency controller may be further configured to detect an operational frequency of the inverter and adaptively adjust the resonant frequency of the wireless power resonator in response to the detection.

The wireless power transmission apparatus may further include a power controller configured to adaptively adjust an operational characteristic of the power supply in response to a detected operational characteristic of a wireless power reception apparatus.

The wireless power transmission apparatus may further include a power controller configured to adaptively adjust an operational frequency of the inverter in response to a power requirement of a wireless power reception apparatus.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
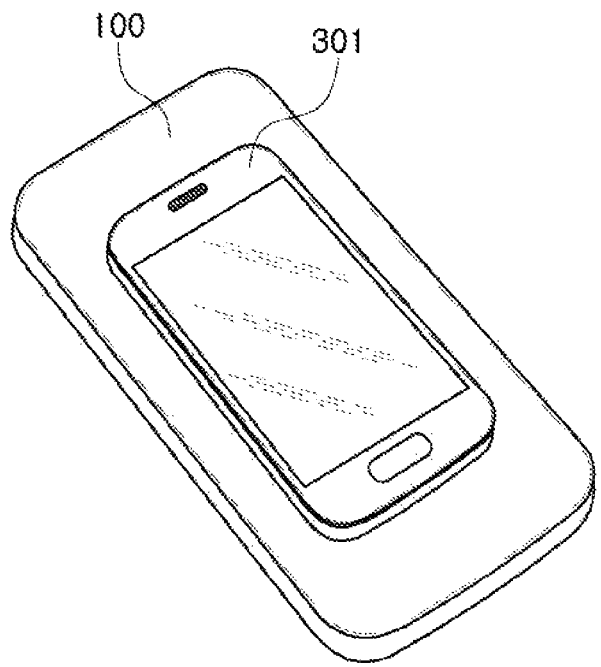
FIG. 1 is a view illustrating a wireless power transmission apparatus according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there are no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" than the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic views. In the drawings, for example, due to manufacturing techniques and/or tolerances, modifications of the shape shown may be encountered. Thus, embodiments should not be construed as being limited to the particular shapes of regions shown herein, but should be understood to include, for example, a change in shape resulting from manufacturing. The following embodiments may also be constituted by one or a combination thereof.

Figure 2:
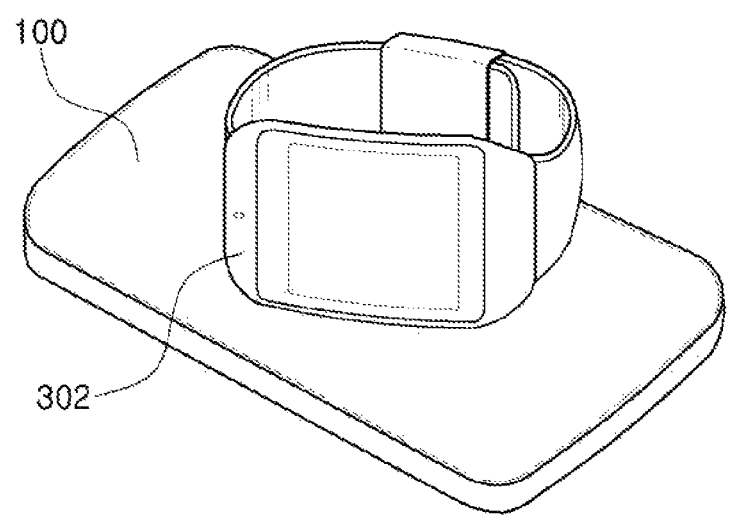
FIG. 2 is a view illustrating a wireless power transmission apparatus according to an embodiment.

FIG. 1 is a view illustrating an example of applying a wireless power transmission apparatus according to an embodiment. FIG. 2 is a view illustrating another example of applying the wireless power transmission apparatus according to an embodiment.

FIG. 1 illustrates an example in which the wireless power transmission apparatus 100 performs charging on a mobile terminal 301, and FIG. 2 illustrates an example in which the wireless power transmission apparatus 100 performs charging on a wearable device 302.

The mobile terminal 301 is internally or externally connected to a wireless power reception apparatus. The wireless power reception apparatus wirelessly receives power from the wireless power transmission apparatus 100 and provides power to the mobile terminal 301.

Similarly, the wearable device 302 includes a wireless power reception apparatus. The wireless power reception apparatus wirelessly receives power from the wireless power transmission apparatus 100 and provides power to the wearable device 302.

In this manner, the wireless power reception apparatus may be applied to various electronic apparatuses, and depending on the electronic apparatus type and required power levels, the wireless power reception apparatus may have different charging characteristics, for example, variations in resonant frequency, a required level of power, and the like.

Therefore, the wireless power transmission apparatus according to an embodiment wirelessly transmits power in response to variable charging characteristics so as to correspond to various wireless power reception apparatuses as described above.

The following description provides various embodiments of a wireless power transmission apparatus capable of effectively transmitting power even when charging characteristics are changed, and a method of controlling the wireless power transmission apparatus.

Hereinafter, various embodiments will be described in further detail with reference to FIG. 3 through FIG. 9.

Figure 3:
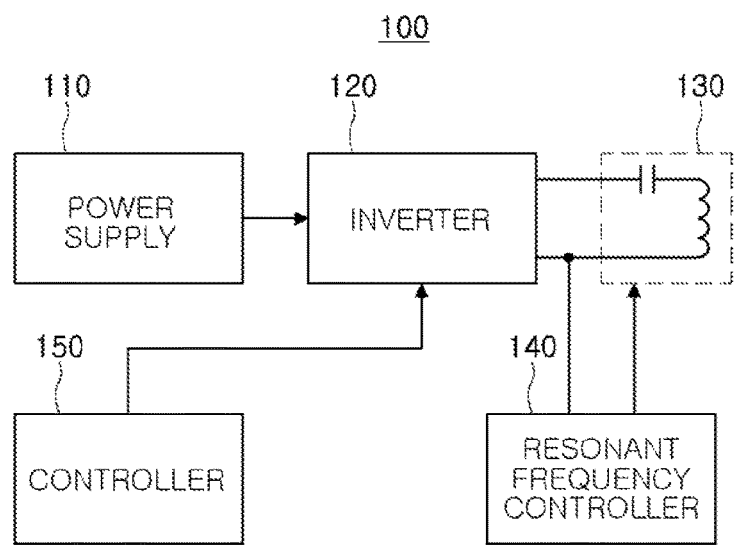
FIG. 3 is a block diagram illustrating the wireless power transmission apparatus according to an embodiment.

FIG. 3 is a block diagram illustrating the wireless power transmission apparatus according to an embodiment.

Referring to FIG. 3, the wireless power transmission apparatus 100 includes an inverter 120, a resonator 130, and a resonant frequency controller 140. According to embodiments, the wireless power transmission apparatus 100 further includes a power supply 110 and/or a controller 150.

The power supply 110 provides a power source for power transmission. For example, the power supply 110 includes a direct current (DC)-DC conversion circuit varying a magnitude of an input voltage and outputting power.

The inverter 120 performs a switching operation and operates the resonator 130.

The resonator 130 is magnetically coupleable to a resonator of a wireless power reception apparatus to wirelessly provide power to the wireless power reception apparatus.

The resonant frequency controller 140 controls a resonant frequency of the resonator 130 in response to a change in operating frequency of the inverter 120.

For example, when the operating frequency of the inverter 120 increases to a predetermined level or more, the resonant frequency controller 140 decreases the resonant frequency of the resonator 130. Alternatively, when the operating frequency of the inverter 120 decreases to a predetermined level or less, the resonant frequency controller 140 increases the resonant frequency of the resonator 130.

In an embodiment, the resonant frequency controller 140 controls capacitance or inductance of the resonator 130 to control the resonant frequency of the resonator 130.

The resonant frequency controller 140 is further described with reference to FIG. 5 through FIG. 8.

The controller 150 controls an operation of the inverter 120.

The controller 150 includes a processor. According to one or more embodiments, the controller 150 further includes a memory. Here, the processor includes, for example, a central processing unit (CPU), a graphics processing unit (GPU), a microprocessor, an application specific integrated circuit (ASIC), a field programmable gate array (FPGA) and the like, and may have a plurality of cores. The memory may be a volatile memory (for example, a RAM or the like), a non-volatile memory (for example, a ROM, a flash memory, or the like), or combinations of these memories.

The controller 150 identifies power requirements of the wireless power reception apparatus.

By way of example, the above-described required power is received from the wireless power reception apparatus in an in-band communication scheme performing communications by modulating or demodulating a wireless power signal. That is, since the wireless power signal formed between the wireless power reception apparatus and the wireless power transmission apparatus forms a magnetic field or a closed loop within the magnetic field, in a case in which the wireless power reception apparatus modulates the wireless power signal while receiving the wireless power signal, the wireless power transmission apparatus 100 senses the modulated wireless signal. The wireless power transmission apparatus 100 demodulates the modulated wireless signal and identifies the required power of the wireless power reception apparatus.

Alternatively, the wireless power reception apparatus provides an indication of required power to the wireless power transmission apparatus 100 using a near field communication (NFC) or short range wireless method such as Bluetooth, Zigbee, Wifi, or other suitable short range wireless scheme.

The controller 150 controls the operating frequency of the inverter 120 according to the identified required power.

Figure 4:
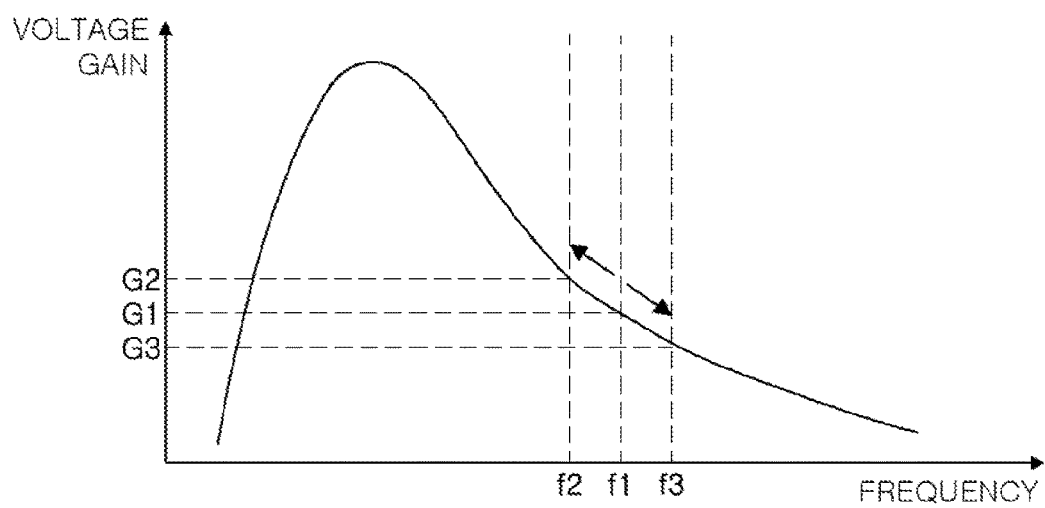
FIG. 4 is a graph illustrating an example of a relationship between a voltage gain and an operating frequency of a wireless power transmission apparatus.

FIG. 4 is a graph illustrating an example relationship between a voltage gain and an operating frequency of the wireless power transmission apparatus. With reference to FIG. 3 and FIG. 4, control of the operating frequency of the inverter 120 by the controller 150 is further described.

FIG. 4 is a graph illustrating a resonant frequency of the wireless power transmission apparatus, according to an embodiment.

It is seen, in FIG. 4, that when the operating frequency decreases from an operating frequency f1 to an operating frequency f2, the voltage gain increases from G1 to G2. In a similar manner, it is seen that when the operating frequency increases from the operating frequency f1 to the operating frequency f3, the voltage gain decreases from G1 to G3. That is, it is seen that variations in operating frequency and variations in voltage gain are in inverse proportion to each other within the relevant illustrative operational window.

Therefore, when the required power increases (as reported by the wireless power receiver), the controller 150 reduces the operating frequency of the inverter 120 to increase the voltage gain. When the required power decreases, the controller 150 increases the operating frequency of the inverter 120 to decrease the voltage gain.

As illustrated in FIG. 4, even in a case in which the operating frequency of the inverter 120 is controlled, it may be controlled within a predetermined range. For example, the operating frequency may have a predetermined range according to wireless power charging standards.

Therefore, in an embodiment, the resonant frequency is controlled in response to variations in the operating frequency. Hereinafter, with reference to FIG. 5 through FIG. 7, the wireless power transmission apparatus capable of controlling the resonant frequency and a method of controlling the wireless power transmission apparatus according to an embodiment will be described in further detail.

Figure 5:
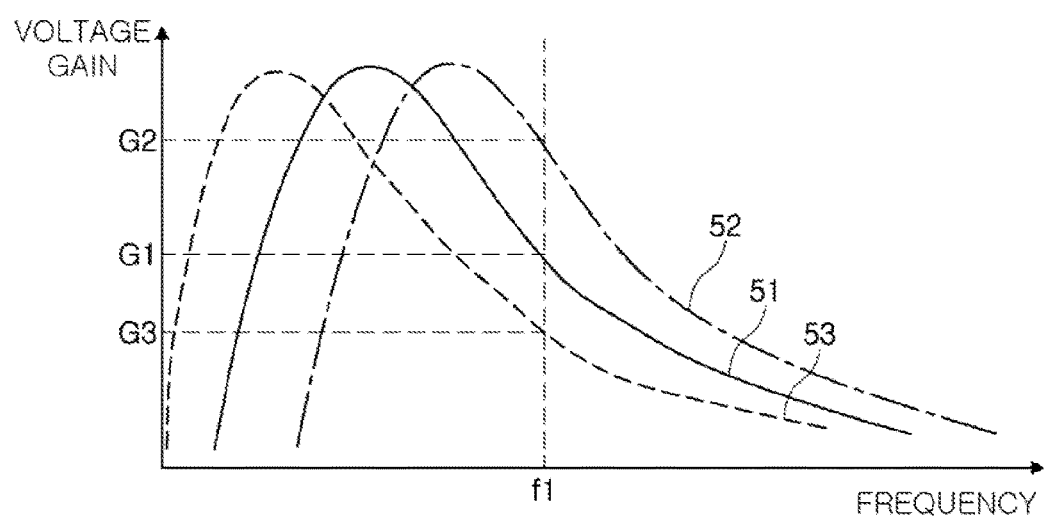
FIG. 5 is a graph illustrating an example of a relationship between a voltage gain and a resonant frequency of the wireless power transmission apparatus.

FIG. 5 is a graph illustrating an example relationship between a voltage gain and a resonant frequency of the wireless power transmission apparatus.

Reference numeral 51 indicates a voltage gain curve of the wireless power transmission apparatus in a reference resonant frequency, reference numeral 52 indicates a voltage gain curve of the wireless power transmission apparatus in a resonant frequency higher than the reference resonant frequency, and reference numeral 53 indicates a voltage gain curve of the wireless power transmission apparatus in a resonant frequency lower than the reference resonant frequency.

In the illustrated graph, the operating frequency of the inverter 120 (illustrated in FIG. 2) is in a state of being fixed to the operating frequency f1.

As illustrated in the graph, in a case in which the operating frequency f1 of the inverter 120 is fixed, it can be seen that when the resonant frequency increases from the resonant frequency 51 to the resonant frequency 52, the voltage gain increases from G1 to G2. It can also be seen that when the resonant frequency increases from the resonant frequency 51 to the resonant frequency 53, the voltage gain decreases from G1 to G3.

The reason for this is that the resonant frequency according to the current wireless power transmission standards has voltage gain characteristics as illustrated in FIG. 3.

Consequently, in an embodiment, when required power of the wireless power reception apparatus increases, the resonant frequency is increased to increase the voltage gain. In addition, when the required power of the wireless power reception apparatus decreases, the resonant frequency is reduced to lower the voltage gain.

Therefore, as described in FIG. 3 and FIG. 4, the wireless power transmission apparatus according to an embodiment controls the operating frequency of the inverter 120 within a predetermined range, and controls the resonant frequency of the resonator 130 when the operating frequency of the inverter 120 is outside of a predetermined range.

Thus, the wireless power transmission apparatus according to an embodiment, covers a range of various required power levels for different wireless power reception apparatuses as compared to a wireless power transmission apparatus according to the related art. The resonant frequency of the wireless power transmission apparatus, according to an embodiment, may be changed according to identified changes in required power of the wireless power reception apparatus even in various circumstances regardless of a kind of a wireless power reception apparatus, distance limitation, etc., thereby leading to an increase in voltage gain and efficient provision of power. The wireless power transmission apparatus according to an embodiment may also be applied to cases in which a kind of a wireless power reception apparatus is altered or a position thereof is changed.

A resonant frequency $f_r$ may be represented by the following mathematical formula 1, where $f_r$ is a resonant frequency, $L_r$ is inductance of a resonator of the wireless power transmission apparatus, and $C_r$ is capacitance of the resonator.

$$f_r = \frac{1}{2\pi\sqrt{L_r C_r}}$$ [Mathematical Formula 1]

In other words, a resonant frequency $f_r$ is equal to 1 over $2\pi$ times the square root of inductance of the resonator wireless power transmission apparatus $L_r$ times the capacitance of the resonator $C_r$.

For example, the wireless power transmission apparatus controls capacitance of the resonator, thereby changing the resonant frequency. That is, capacitance of the resonator may be reduced to increase the resonant frequency. Alternatively, capacitance of the resonator may be increased to reduce the resonant frequency. Still further, the inductance may be suitably increased or reduced to respectively reduce or increase the resonant frequency.

Hereinafter, with reference to FIG. 6 through FIG. 7, the wireless power transmission apparatus capable of controlling the resonant frequency by varying capacitance, and a method of controlling the wireless power transmission apparatus according to an embodiment, will be further described.

However, unlike a description to be described later, the resonant frequency may also be controlled by varying inductance of the resonator, which will be understood with reference to the following description.

Figure 6:
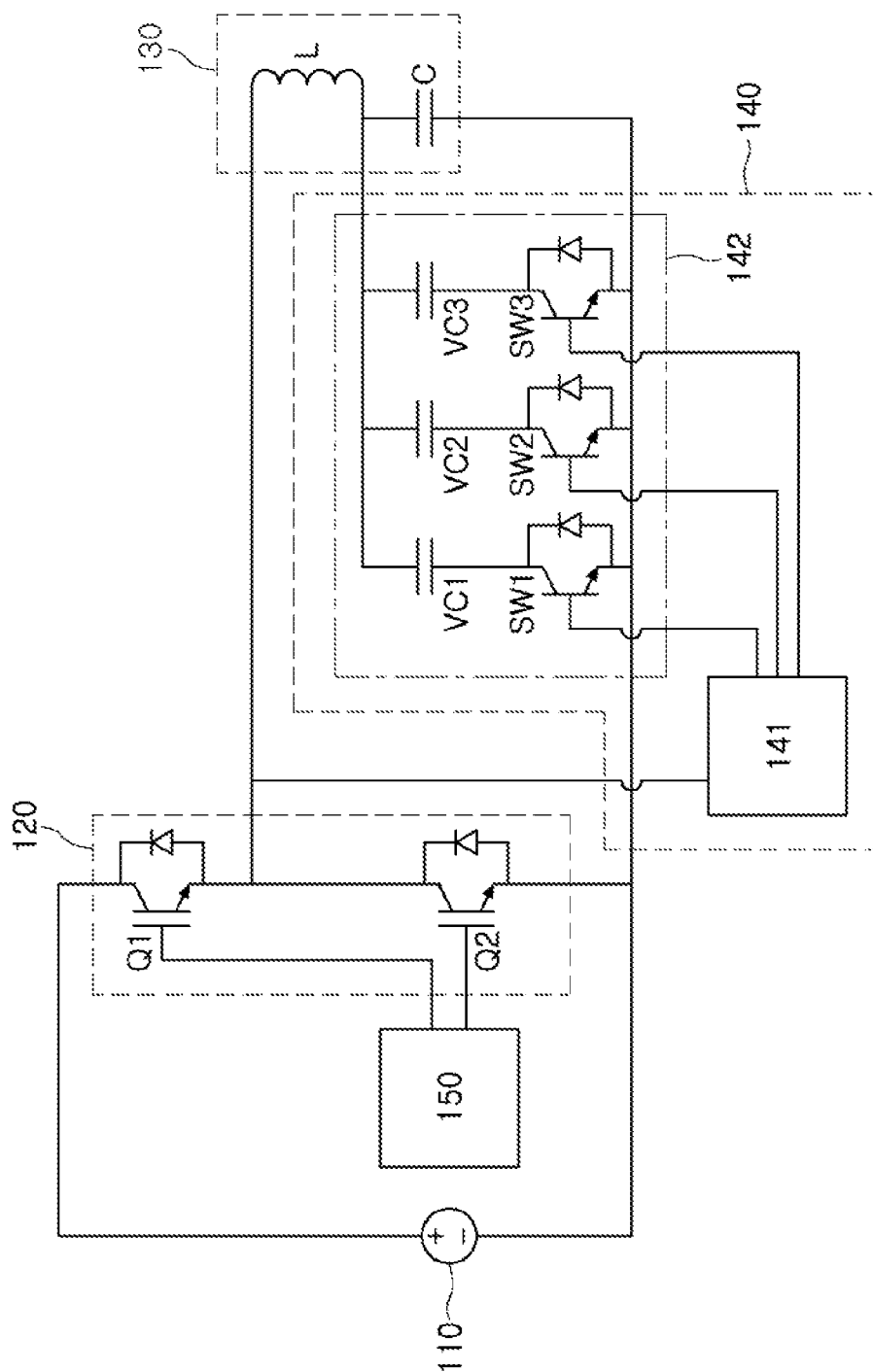
FIG. 6 is a circuit diagram illustrating a wireless power transmission apparatus according to an embodiment.

FIG. 6 is a circuit diagram illustrating a wireless power transmission apparatus according to an embodiment. The wireless power transmission apparatus illustrated in FIG. 6 relates to an embodiment in which the resonant frequency controller 140 varies capacitance to control the resonant frequency. However, according to one or more embodiments, the wireless power transmission apparatus is modified in such a manner that the resonant frequency controller 140 varies inductance to control the resonant frequency.

Referring to FIG. 6, a wireless power transmission apparatus 200 includes the power supply 110, the inverter 120, the resonator 130, and the resonant frequency controller 140.

The inverter 120 converts a DC voltage output from the power supply 110 into an AC voltage appropriate for wireless power transmission. Inverter 120 is illustrated as a half-bridge inverter in which two switches Q2 and Q3 are connected in series. However, the inverter 120 is not limited thereto. Inverter 120, may be implemented with another type of inverter such as a full-bridge inverter, or other suitable inverter, as would be known to one of skill in the art after gaining a thorough understanding of the subject application. A switching operation of switches included in the inverter 120 are controlled by a controller and thus, the controller controls a switching frequency of the switches to thereby control the operating frequency of the inverter 120.

The resonator 130 is magnetically coupleable to a resonator of the wireless power reception apparatus, and wirelessly provides power to the wireless power reception apparatus. For example, the AC voltage output by the inverter 120 generates a magnetic field through the resonator 130, and the generated magnetic field is induced to the resonator of the wireless power reception apparatus, whereby power is transmitted to a receiving side.

The resonator 130 is connected to the resonant frequency controller 140. A resonant frequency of the resonator 130 is changed due to a capacitance variation in a variable capacitor 142 of the resonant frequency controller 140.

In the illustrated embodiment, the resonator 130 and the variable capacitor 142 are described as separate components, but it is merely for clarity, conciseness, and convenience of explanation. Thus, the resonator 130 and the variable capacitor 142 may be implemented as a single component.

The resonant frequency controller 140 varies the resonant frequency of the resonator 130 in response to a change in operating frequency of the inverter 120. The resonant frequency controller 140 detects the operating frequency of the inverter 120, and in response to the operating frequency departing a predetermined range, the resonant frequency controller 140 varies the capacitance of the resonator 130 in response thereto to vary the resonant frequency of the resonator 130.

The resonant frequency controller 140 includes the variable capacitor 142 and a capacitance controller 141.

The variable capacitor 142 varies capacitance of the resonator 130.

The variable capacitor 142 one end connected to the resonator 130. By way of example, the capacitor controller 141 is connected to at least one capacitor of the resonator 130 in series, and has the other end connected to an output terminal of the inverter 120. Capacitance of the variable capacitor 142 is varied according to an operation of the capacitance controller 141, and accordingly, synthetic capacitance of the variable capacitor 142 and the resonator 130 are also variably set.

The variable capacitor 142 includes a plurality of switches SW1 to SW3 and a plurality of capacitors VC1 to VC3 connected in series to the plurality of switches SW1 to SW3, respectively. The switches are controlled by capacitance controller 141.

In an embodiment, the plurality of capacitors VC1 to VC3 have different levels of capacitance. For example, a first capacitor VC1 has a reference capacitance, a second capacitor VC2 has a capacitance two times greater than that of the first capacitor VC1, and a third capacitor VC3 has a capacitance five times greater than that of the first capacitor VC1. In the embodiment as described above, since various combinations of synthetic capacitors with regard to the plurality of capacitors VC1 to VC3 are enabled, variously variable capacitance is provided even with a small number of capacitors.

The capacitance controller 141 detects the operating frequency of the inverter 120, and compares the operating frequency with a predetermined range to change capacitance of the variable capacitor 142.

The capacitance controller 141, in an embodiment, is implemented as a processor. According to embodiments, the capacitance controller 141 further includes a memory. The processor includes, for example, a central processing unit (CPU), a graphics processing unit (GPU), a microprocessor, an application specific integrated circuit (ASIC), a field programmable gate array (FPGA), and the like, and may have a plurality of cores.

Figure 7:
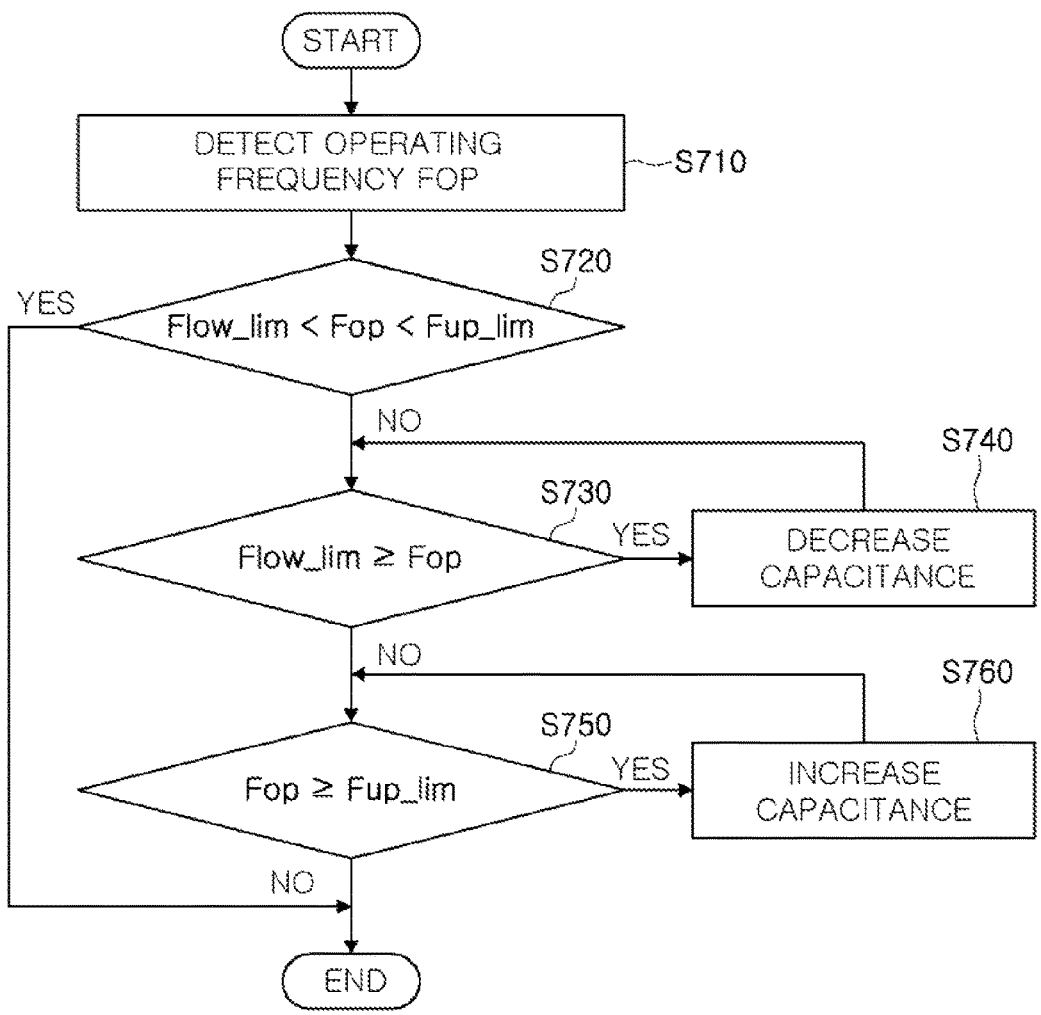
FIG. 7 is a flow chart illustrating a method of varying capacitance performed in a wireless power transmission apparatus according to an embodiment.

FIG. 7 is an example flow chart illustrating a method of varying capacitance performed in the wireless power transmission apparatus illustrated in FIG. 6. With reference to FIG. 6 through FIG. 7, operations of the capacitance controller 141 are further described.

The capacitance controller 141 detects an operating frequency Fop of the inverter 120 (S710).

The capacitance controller 141 identifies whether the operating frequency Fop of the inverter 120 is within a predetermined range (S720). Here, the predetermined range of the operating frequency includes a predetermined upper limit Fup_lim and a predetermined lower limit Flow_lim.

When the operating frequency Fop of the inverter 120 has a value between the predetermined upper limit Fup_lim and the predetermined lower limit Flow_lim (S720, YES), the capacitance controller 141 does not vary capacitance.

When the operating frequency Fop of the inverter 120 is less than the predetermined lower limit Flow_lim (S730, YES), the capacitance controller 141 controls the variable capacitor 142 to increase the resonant frequency. That is, the capacitance controller 141 controls the variable capacitor 142 to reduce capacitance of the variable capacitor 142 (S740).

On the other hand, when the operating frequency Fop of the inverter 120 is greater than the predetermined upper limit Fup_lim (S750, YES), the capacitance controller 141 controls the variable capacitor 142 to reduce the resonant frequency. That is, the capacitance controller 141 controls the variable capacitor 142 to increase capacitance of the variable capacitor 142 (S740) to thereby reduce the resonant frequency.

FIG. 7 explains the method of varying capacitance, on a one-time operation basis, but according to embodiments, the method of varying capacitance illustrated in FIG. 7 is consecutively and repeatedly performed in a continuous calculation.

Figure 8:
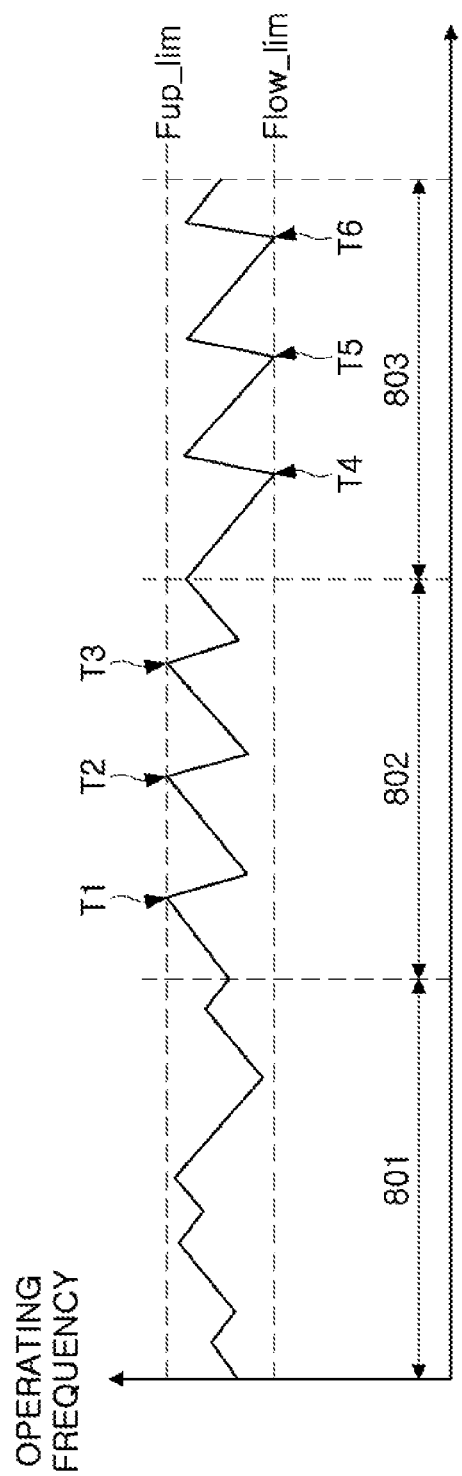
FIG. 8 is a graph illustrating a method of varying capacitance according to an embodiment.

FIG. 8 is an example graph illustrating the method of varying capacitance illustrated in FIG. 6. With reference to FIG. 6 through FIG. 7, a method of controlling capacitance is further described. The graph shows an operating frequency on a first axis and a time (delineated by periods e.g. 801, 802, 803) on a second axis.

Explaining the method with reference to FIG. 6 and FIG. 8, a period 801 is in a state in which the operating frequency Fop of the inverter 120 is present between the predetermined upper limit Fup_lim and the predetermined lower limit Flow_lim.

In this state, since the operating frequency Fop of the inverter 120 is varied but within a predetermined range, the period 801 is a period in which capacitance is not varied, thereby resulting in no variation in the resonant frequency.

A period 802 is a period in which a charging distance or a charging angle is reduced, and thus, required power gradually decreases. That is, it is seen that the operating frequency of the inverter 120 increases, and when the operating frequency reaches the predetermined upper limit Fup_lim (points of time T1, T2, and T3), capacitance is varied to reduce the resonant frequency.

That is, in the period 802, since the required power gradually decreases, the capacitance controller 141 increases capacitance of the variable capacitor 142, thereby decreasing the resonant frequency. Since the resonant frequency decreases in accordance with an increase in capacitance, a voltage gain may be lowered in response to a decrease in required power.

A period 803 is a period in which a charging distance or a charging angle increases away from a normal, coaxial alignment, and thus required power for charging gradually increases. That is, it is seen that the operating frequency of the inverter 120 decreases, and when the operating frequency reaches the predetermined lower limit Flow_lim (points of time T4, T5, and T6), capacitance is varied to increase the resonant frequency.

That is, in the period 803, since the required power gradually increases, the capacitance controller 141 decreases capacitance of the variable capacitor 142, thereby increasing the resonant frequency. Since the resonant frequency increases in accordance with a decrease in capacitance, a voltage gain is increased in response to an increase in required power.

In the foregoing embodiments, descriptions are made on the basis of controlling the resonant frequency by changing capacitance of the resonator, using the variable capacitor 142 connected to the resonator 120. However, according to one or more embodiments, modifications to the resonant frequency are made in such a manner that the resonant frequency is controlled by changing inductance in lieu, or in addition, to the changes in capacitance.

Figure 9:
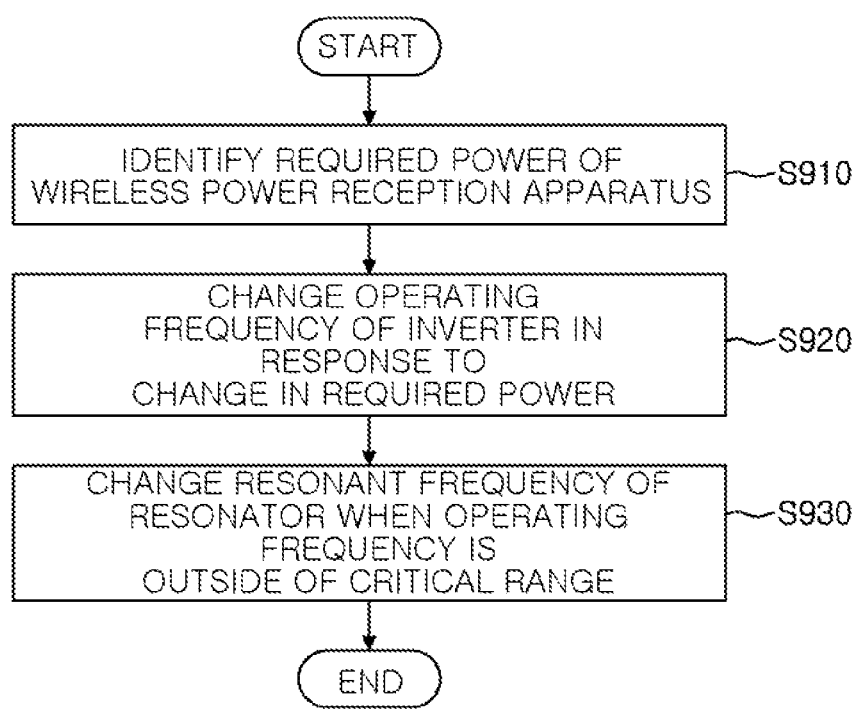
FIG. 9 is a flow chart illustrating a method of controlling a wireless power transmission apparatus according to an embodiment.

FIG. 9 is a flow chart illustrating a method of controlling a wireless power transmission apparatus according to an embodiment.

A method of controlling a wireless power transmission apparatus described hereinafter is a method of controlling the wireless power transmission apparatus described with reference to FIG. 3 through FIG. 8, and thus may be further understood with reference to the contents described in FIG. 3 through FIG. 8.

Referring to FIG. 9, the wireless power transmission apparatus identifies information regarding required power from a wireless power reception apparatus (S910).

The wireless power transmission apparatus adaptively adjusts the operating frequency of the inverter in response to a change in required power (S920).

When the operating frequency is outside of a predetermined range, the wireless power transmission apparatus changes the resonant frequency of the resonator thereof (S930).

In an embodiment of the operation S920, the wireless power transmission apparatus decreases the operating frequency of the inverter when the required power increases and, on the other hand, increases the operating frequency when the required power decreases.

In an embodiment of the operation S930, the wireless power transmission apparatus reduces the resonant frequency when the operating frequency increases to a predetermined level or more. That is, as described above, since an increase in operating frequency corresponds to a case in which required power decreases, the wireless power transmission apparatus reduces the resonant frequency of the resonator and controls the voltage gain to be lowered.

In an embodiment of the operation S930, the wireless power transmission apparatus increases the resonant frequency when the operating frequency decreases to a predetermined level or less. That is, as described above, since a decrease in operating frequency corresponds to a case in which required power increases, the wireless power transmission apparatus increases the resonant frequency of the resonator to control the voltage gain to be increased.

In an embodiment of the operation S930, the wireless power transmission apparatus increases capacitance of the resonator when the operating frequency increases to a predetermined level or more. That is, as described above, since an increase in operating frequency corresponds to a case in which required power decreases, the wireless power transmission apparatus reduces the resonant frequency of the resonator to lower the voltage gain. To this end, the wireless power transmission apparatus increases capacitance of the resonator, thereby decreasing the resonant frequency.

In an embodiment of the operation S930, the wireless power transmission apparatus decreases capacitance of the resonator when the operating frequency decreases to a predetermined level or less. That is, as described above, since a decrease in operating frequency corresponds to a case in which required power increases, the wireless power transmission apparatus increases the resonant frequency of the resonator to increase the voltage gain. To this end, the wireless power transmission apparatus decreases capacitance of the resonator, thereby increasing the resonant frequency.

The apparatuses, units, modules, devices, controllers, random number generators, and other components illustrated in FIGS. 1-3 and 6 that perform the operations described herein with respect to FIGS. 4-5 and 7-9 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 4-5 and 7-9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-5 and 7-9 that perform the operations described herein may be performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art, after gaining a thorough understanding of the present disclosure, can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As set forth above, a wireless power transmission apparatus according to an embodiment effectively performs wireless charging even in circumstances in which required power of a wireless power reception apparatus is variously changed.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power transmission apparatus, comprising:
   a resonator configured to magnetically couple to a power reception apparatus;
   an inverter configured to operate the resonator; and
   a resonant frequency controller configured to:
      detect an operating frequency of the inverter,
      determine whether the operating frequency is in a range between a lower limit and an upper limit,
      in a case in which the operating frequency is less than the lower limit, increase a resonant frequency of the resonator, and
      in a case in which the operating frequency is greater than the upper limit, decrease the resonant frequency of the resonator.

2. The power transmission apparatus of claim 1, wherein the resonant frequency controller is configured to vary a capacitance of the resonator to increase or decrease the resonant frequency.

3. The power transmission apparatus of claim 1, further comprising: a controller configured to determine a power requirement of the power reception apparatus and adaptively adjust the operating frequency of the inverter based on the power requirement.

4. The power transmission apparatus of claim 3, wherein the controller is configured to decrease the operating frequency in response to an increase in the power requirement.

5. The power transmission apparatus of claim 1, wherein the resonant frequency controller comprises:
   a variable capacitor configured to vary capacitance of the resonator; and
   a capacitance controller configured to:
      control capacitance of the variable capacitor based on whether the operating frequency is in a range between a lower limit and an upper limit.

6. The power transmission apparatus of claim 5, wherein the capacitance controller is configured to increase the capacitance of the variable capacitor in the case in which the operating frequency is greater than the upper limit.

7. The power transmission apparatus of claim 5, wherein the capacitance controller is configured to decrease the capacitance of the variable capacitor in the case in which the operating frequency is less than the lower limit.

8. A method of controlling a power transmission apparatus, the method comprising:
   determining a power requirement of a power reception apparatus;
   controlling an operating frequency of an inverter connected to a resonator based on the power requirement, the resonator being configured to magnetically couple to the power reception apparatus;
   determining whether the operating frequency is in a range between a lower limit and an upper limit;
   in a case in which the operating frequency is less than the lower limit, increasing a resonant frequency of the resonator; and
   in a case in which the operating frequency is greater than the upper limit, decreasing the resonant frequency of the resonator.

9. The method of claim 8, wherein the controlling of the operating frequency of the inverter comprises:
   decreasing the operating frequency in response to an increase in the power requirement; and
   increasing the operating frequency in response to a decrease in the power requirement.

10. The method of claim 9, further comprising:
    increasing capacitance of the resonator in the case in which the operating frequency is greater than the upper limit.

11. The method of claim 9, further comprising:
    decreasing capacitance of the resonator in the case in which the operating frequency is less than the lower limit.

12. A power transmission apparatus, comprising:
    an inverter and a resonator;
    a power supply configured to supply power to the resonator; and
    a resonant frequency controller configured to control a resonant frequency of the resonator in response to a detected operational frequency of the inverter such that the resonant frequency of the resonator is increased in a case in which the detected operational frequency is less than a lower limit, and the resonant frequency of the resonator is decreased in a case in which the detected operational frequency is greater than an upper limit.

13. The apparatus of claim 12, wherein the resonant frequency controller is configured to detect a load on the power supply and adaptively adjust the resonant frequency of the resonator in response to the detection.

14. The apparatus of claim 12, further comprising a power controller configured to adaptively adjust an operational characteristic of the power supply based on a detected operational characteristic of a power reception apparatus.

15. The apparatus of claim 12, further comprising a power controller configured to adaptively adjust the operational frequency of the inverter based on a power requirement of a power reception apparatus.

* * * * *